J. K. WILSON.
Trestle Platforms for Unloading from Wagons.

No. 137,584.  Patented April 8, 1873.

Witnesses—  John K. Wilson
by E. Thurton, his atty

UNITED STATES PATENT OFFICE.

JOHN K. WILSON, OF BRIMFIELD, ILLINOIS.

IMPROVEMENT IN TRESTLE-PLATFORMS FOR UNLOADING FROM WAGONS.

Specification forming part of Letters Patent No. 137,584, dated April 8, 1873; application filed March 3, 1873.

*To all whom it may concern:*

Be it known that I, JOHN K. WILSON, of Brimfield, in the county of Peoria and in the State of Illinois, have invented a Trestle-Platform by which to Unload Corn, Potatoes, &c., from Wagons; and do hereby declare that the following is a full, clear, and exact description thereof, reference being had to the annexed drawing making a part of this specification, in which like letters of reference refer to like parts, and in which—

Figure 1:
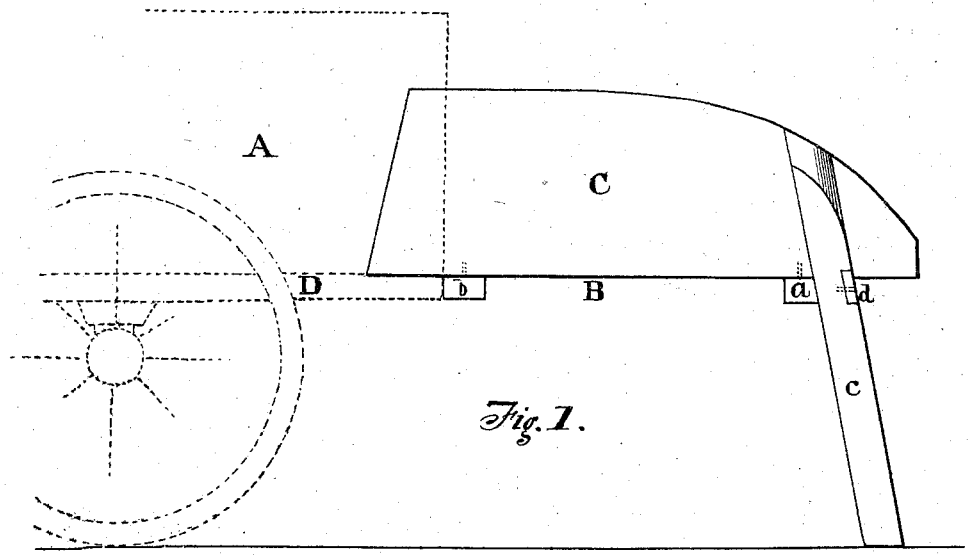
Figure 2:
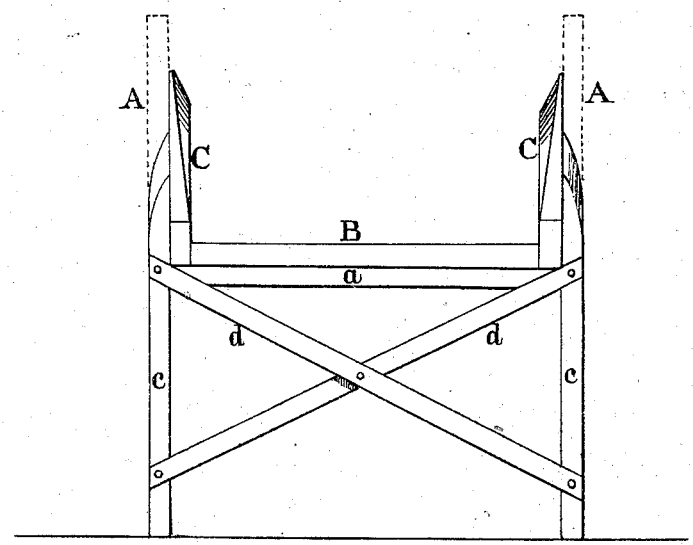

Figure 1 represents a side elevation, showing its position when applied to a wagon; Fig. 2, an end view from the rear, the dotted lines, as in Fig. 1, showing the sides of the wagon.

This invention consists of a horizontal platform with vertical sides, open at both ends and supported at one end by legs. The other end is inserted in the wagon, and resting upon the wagon-bed behind the tail-board, so that, on the removal of the latter, the contained load, as corn, apples, &c., can be shoveled out, the platform forming a table for the insertion of a shovel under the corn or other load when there is no regular horizontal shoveling-board attached to the wagon.

In the drawing, A is the wagon; D, the wagon-bed; B, the bottom of the trestle-platform or scoop-table; C C, the sides—all of which are beveled from their inner surfaces to the outer edges where it enters the wagon, for the purpose of more readily inserting that end into the wagon to be unloaded between the same and the contained load. The sides and bottom may be secured together in any efficient manner—as nails or screws—and should be strengthened beneath by braces $a\,b$. The outer end of the platform is supported by legs $c\,c$, inclined toward that part of the platform which is inserted into the wagon end, and strengthened by braces $d\,d$. The brace $b$ at the wagon end of this platform also prevents the platform from sliding too far into the wagon.

The operation of this platform needs no description, save what has been already given. When inserted into the end of the wagon it affords a space on which, when the tail-board is removed from the wagon, the corn, apples, or other produce rolls down, and a shovel or scoop can be readily used for the unloading of the same. In the form herein described this trestle-platform is calculated for use upon farms, &c.; but when the platform is desired to be used with or to accompany the wagon, the legs may be made to fold up under the bed of the platform, to occupy less space.

What I claim as my invention is—

The trestle-platform B C C $a\,b$, made to slide into the end of a wagon for unloading the same, substantially as described.

In testimony that I claim the foregoing trestle-platform I have hereunto set my hand this 21st day of February, 1873.

JOHN K. WILSON.

Witnesses:
HENRY W. WELLS,
JAMES THURLOW.